US012807462B2

United States Patent
Okurogullari

(10) Patent No.: US 12,807,462 B2
(45) Date of Patent: Nov. 24, 2026

(54) TOWER CLIMBING MECHANISM

(71) Applicant: Aydin Okurogullari, Istanbul (TR)

(72) Inventor: Aydin Okurogullari, Istanbul (TR)

( * ) Notice: Subject to any disclaimer, the term of this patent is extended or adjusted under 35 U.S.C. 154(b) by 160 days.

(21) Appl. No.: 18/720,696

(22) PCT Filed: Dec. 30, 2021

(86) PCT No.: PCT/TR2021/051649

§ 371 (c)(1),
(2) Date: Jun. 17, 2024

(87) PCT Pub. No.: WO2023/128909

PCT Pub. Date: Jul. 6, 2023

(65) Prior Publication Data

US 2025/0051145 A1 Feb. 13, 2025

(51) Int. Cl.
*B66C 23/32* (2006.01)
*B66C 23/20* (2006.01)

(52) U.S. Cl.
CPC ............ *B66C 23/32* (2013.01); *B66C 23/207* (2013.01)

(58) Field of Classification Search
CPC .............................. B66C 23/32; B66C 23/207
See application file for complete search history.

(56) References Cited

U.S. PATENT DOCUMENTS

| | | | | |
|---|---|---|---|---|
| 3,998,029 A * | 12/1976 | James | B66C 23/32 212/176 |
| 2021/0155460 A1* | 5/2021 | Gomez Mora | B66C 23/32 |
| 2021/0292134 A1* | 9/2021 | Kalanj | B66C 23/283 |

FOREIGN PATENT DOCUMENTS

| | | | |
|---|---|---|---|
| CN | 105197725 A * | 12/2015 | |
| CN | 107857201 A * | 3/2018 | B66C 23/286 |
| JP | 2009280367 A * | 12/2009 | |

OTHER PUBLICATIONS

CN 105197725A Machine Translation (Year: 2015).*
CN 107857201A Machine Translation (Year: 2018).*
JP 2009280367A Machine Translation (Year: 2009).*

* cited by examiner

*Primary Examiner* — Robert W Hodge
*Assistant Examiner* — Juan J Campos, Jr.
(74) *Attorney, Agent, or Firm* — Kevin J Fournier Intellectual Property Legal Services Ltd; Kevin J Fournier

(57) ABSTRACT

The present invention relates to a climbing mechanism used by mounting a crane on it. The climbing mechanism can climb along the tower on the outer surface of the tower. It reduces the installation cost, as there is no need to use the largest cranes used for tower installation. It provides for the installation of towers higher than the height that the largest cranes can reach.

15 Claims, 17 Drawing Sheets

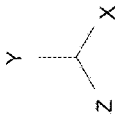
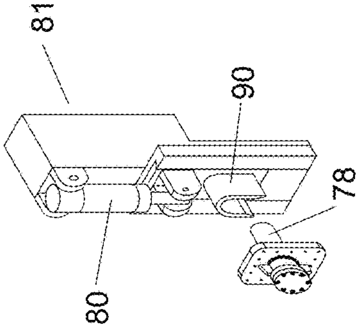
Fig. 17A
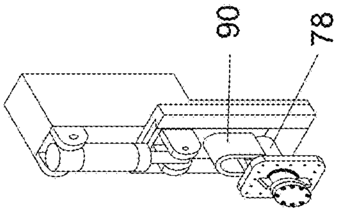
Fig. 17B
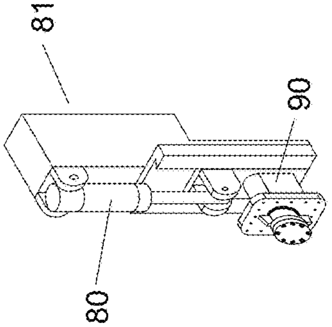
Fig. 17C
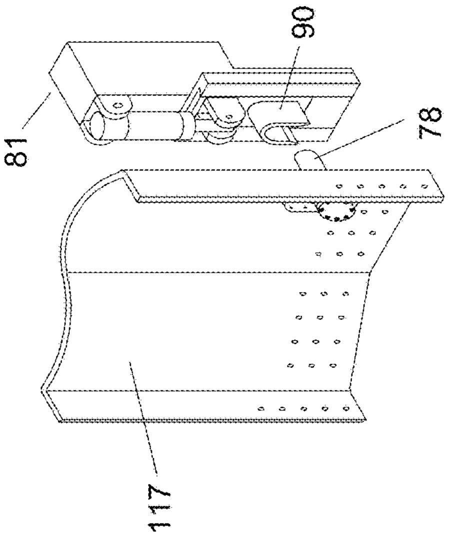
Fig. 17D
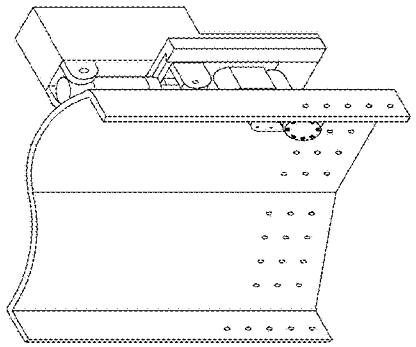
Fig. 17E
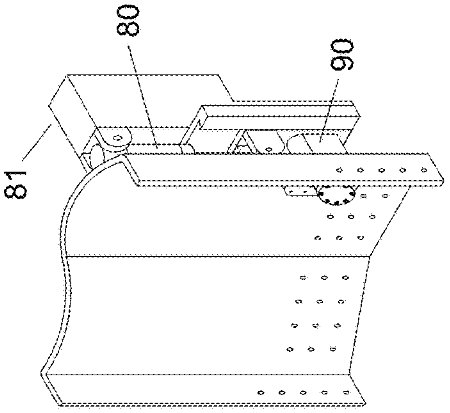
Fig. 17F

TOWER CLIMBING MECHANISM

TECHNICAL AREA

The present invention relates to a climbing mechanism on which a special crane is mounted. Climbing mechanism; narrowing upwards; in conical structure; In a modular tower or cylindrical structure consisting of polygonal cross-section modules added on top of each other, it allows the tower assembly to be made by climbing up on the wall of the wind turbine tower or similar towers.

STATE OF THE ART

As it is known, the wind speed increases as it rises from the ground. Increasing wind speed increases the efficiency of the turbine by producing more electricity. For this reason, turbine manufacturers design turbines and towers operating at higher altitudes. In 2021, the tower heights reached 180 meters. It will exceed 250 meters in the near future. The largest cranes are used for the assembly of wind turbine towers. These cranes have long transportation, installation and relocation times and high costs. In addition, the capacities of the existing cranes may be insufficient due to the tower heights that have increased in recent years and will increase further in the future. In recent years, mechanisms that provide maintenance of tower elements by climbing on the tower have been developed. These mechanisms have side arms that prevent wobble and provide balance. On some models these side arms are wrapped around the turret body. The side arms wrapped around the tower body may cause damage to the tower elements.

In another model, the side arms are fixed to the holes in the tower with the help of a pin on the arms. However, there may be difficulties in performing this procedure.

According to the invention; some special purpose-built cranes in the market can be mounted on a mechanism that climbs along the tower wall during the assembly phase of the tower, and the tower can be assembled. The side arms of the climbing mechanism have U bearings. Each module in the tower has pins mounted against each other. The U bearings on the side arms are fixed to these pins by moving them in the y and z axes. Thanks to this feature; fixing the side arms to the tower is easier than prior art. This prevents the climbing mechanism from wobbling in the tower. In addition, thanks to the guide rail mounted on the tower, all forces from the crane are transmitted to the foundation uninterruptedly through the guide rail and tower elements.

The module height of the modular towers is around 12-13 meters. The first three modules of the tower; It can be done with the help of a mobile crane, which is smaller than the largest cranes. After this stage, the climbing mechanism is mounted on the wall of the tower. A special crane can be mounted on the climbing mechanism, and modules after the third module and other elements of the wind turbine can be mounted with this crane. The climbing mechanism, thanks to its components working on the principle of elevator, is raised by one module height and the next module is mounted. This process is repeated throughout the tower, completing the tower assembly. Finally, the assembly of the wind turbine is completed by mounting the elements of the turbine such as the nacelle, rotor and blades.

The economic life of wind turbines is around 20-25 years. For malfunctions that may occur in this process, one of the biggest cranes should be brought to the power plant area and used. This means a huge cost. However, the maintenance of the tower elements and equipment assembled using the climbing mechanism described in the present invention can be done using the climbing mechanism.

PURPOSE OF THE INVENTION

The invention is a solution to reduce installation time and cost by enabling the erection of high towers without the use of large cranes.

The following are the advantages of the invention.

- The climbing mechanism can be more easily mounted on the pins in the tower thanks to the U bearings on the side arms;
- Thanks to the guide rail mounted on the tower, all the forces coming from the crane are transmitted to the foundation uninterruptedly through the guide rail and tower elements.
- Thanks to the support rods, the forces on the guide rail are transmitted to the other tower elements in the module and become a distributed load;
- High crane cost is reduced as there is no need to use very large cranes;
- Since it is used by climbing the tower, it allows to build higher towers than very large cranes can reach;
- It can be used again in case of malfunctions that may occur after the wind turbine is put into operation;

The disadvantages of the invention are as follows;

- In order to use the invention, some parts (such as guide rail, king pins, support bars) must be fixed to the tower during the production of the tower;

EXPLANATION OF REFERENCES IN FIGURES

Figure 1:
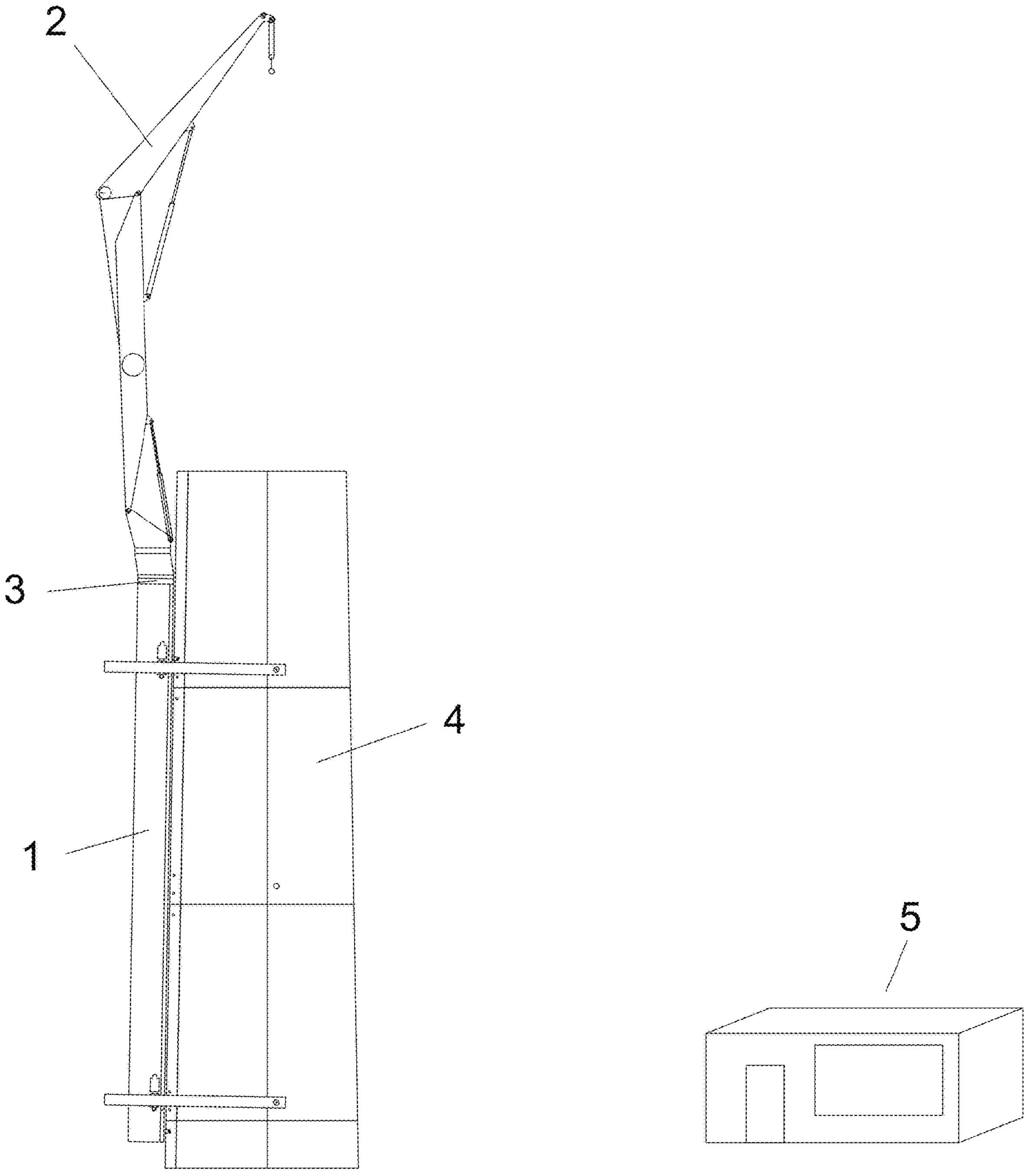
FIG. 1 Overview
FIG. 2 Climbing mechanism overview
FIG. 3 Main components of the climbing mechanism
FIGS. 4A, 4B and 4C, Outer skid
FIGS. 5A and 5B, Outer skid attachment zone
FIGS. 6A, 6B and 6C, Hanger part
FIGS. 7A and 7B, Side arm assembly
FIGS. 8A and 8B, U slot group
FIG. 9 Inner skid
FIG. 10 Wheel group
FIG. 11 Wheel assembly top view
FIGS. 13A to 13G, Working principle of elevator
FIG. 14 Carrier chassis and shell views
FIGS. 15A to 15E, Guide rail view
FIGS. 16A to 16C, King pin slot view
FIGS. 17A to 17F, King pin-tower element wall mounting view
FIG. 18 Support bar assembly view
FIGS. 21A-21F, Climbing mechanism working views

1 Climbing mechanism
2 Crane
3 Crane connection platform
4 Tower
5 Remote control room
6 Inner skid
8 Outer skid
9 Elevator
17 Carrier chassis
18 Shell
19 Door
20 Hydraulic tank
21 Hydraulic valve group

22 Electrical and electronic control panel
23 Platform
24 Side arm assembly
26 Hydraulic cylinder
27 Hydraulic cylinder
29 Guide bearing
30 Reinforcement part
31 Reinforcement part
32 Reinforcement part
33 Stairs
34 Reinforcement part
36 Feder
39 Hanger part
40 Hanger part
41 Hydraulic cylinder
42 Skid column
43 Reinforcement part
44 Reinforcement part
45 Side arm
46 Side arm
47 Side arm
48 Side arm
53 Reinforcement part
54 Reinforcement part
55 Reinforcement part
56 Bracket
57 Guide tube
58 Hydraulic cylinder
59 Hole
67 Lock pin
70 Side arm inner column
73 Reinforcement part
74 Reinforcement part
75 Guide bearing
76 Side arm inner column
77 Hydraulic cylinder
78 King pin
79 Skid bearing
80 Hydraulic cylinder
81 U slot group
82 Camera arm
83 Camera
84 Camera arm
86 Skid column
88 Skid part
89 Reinforcement part
90 U slot
91 Hanger part
92 Hanger part
103 Wheel
104 Wheel
105 Wheel group
106 Bushing body
107 Bushing body
108 Shaft
109 Shaft
110 Pin
113 Bolt hole
114 Bolt hole
116 Tower module
117 Tower element
118 Guide rail
119 Hole
122 Connecting part
123 King pin slot
124 King pin bushing
125 Metal plate
126 Support plate
127 Angle
128 Bolt
131 Support bar
132 Flange
133 y-z cross section

DISCLOSURE OF THE INVENTION (001) The invention relates to a climbing mechanism (1) that climbs upwards along the tower on the outer wall of the tower. Thanks to the crane (2) mounted on it, it enables the elements of the tower and other structural elements to be lifted up to the top of the tower. The crane can be purchased ready-made and integrated into the climbing mechanism.

Components and parts of the climbing mechanism (1) in sections (002 . . . 018); Parts that should be in the tower in sections (019 . . . 022); In chapters (023 . . . 026) the working method of the climbing mechanism (1) is explained.

(002) FIG. 1 shows the general view of the crane (2), the modular tower (4) and the remote control room (5) mounted on the crane connection platform (3) in a climbing mechanism (1).

Figure 2:
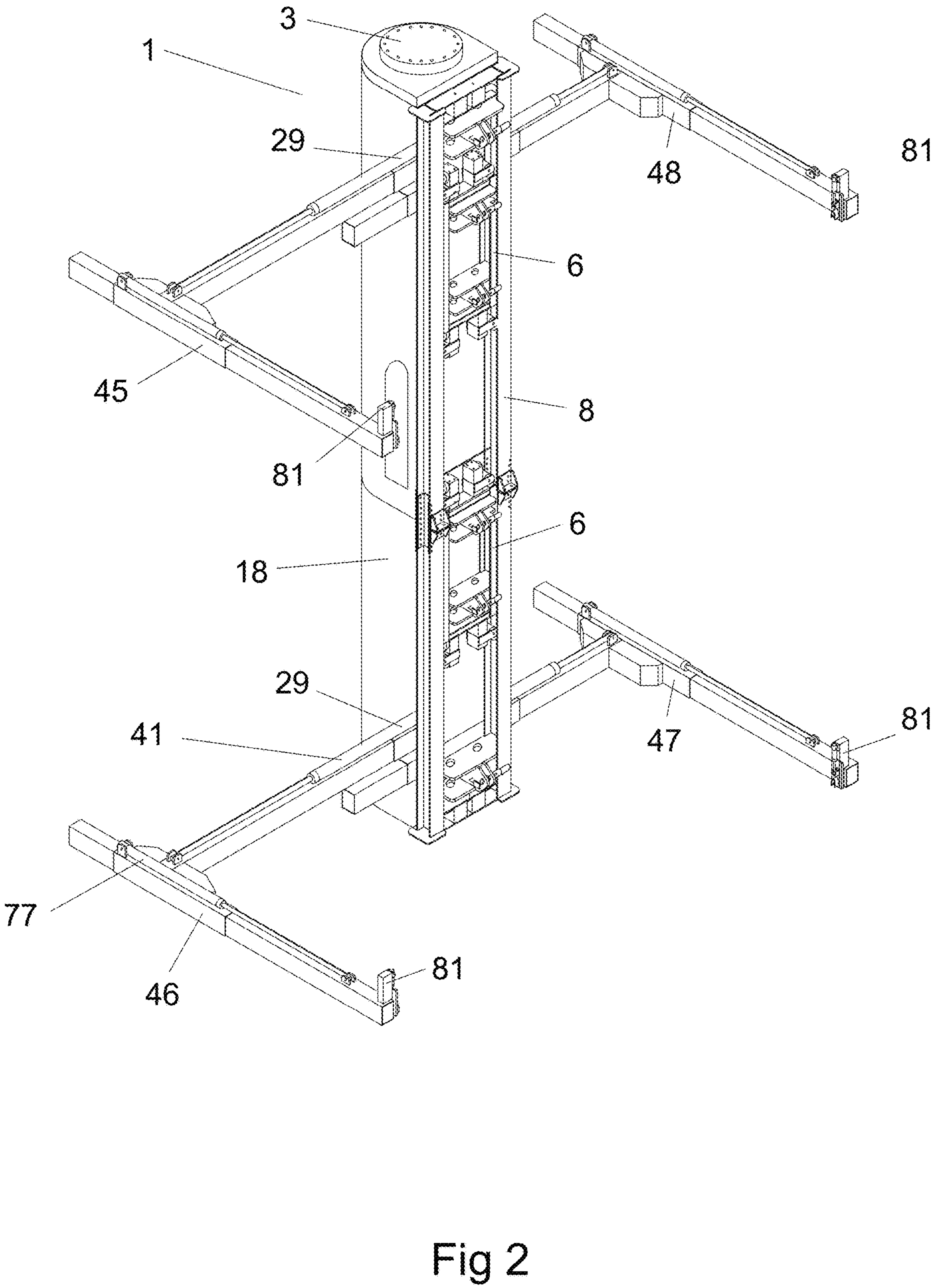
Figure 3:
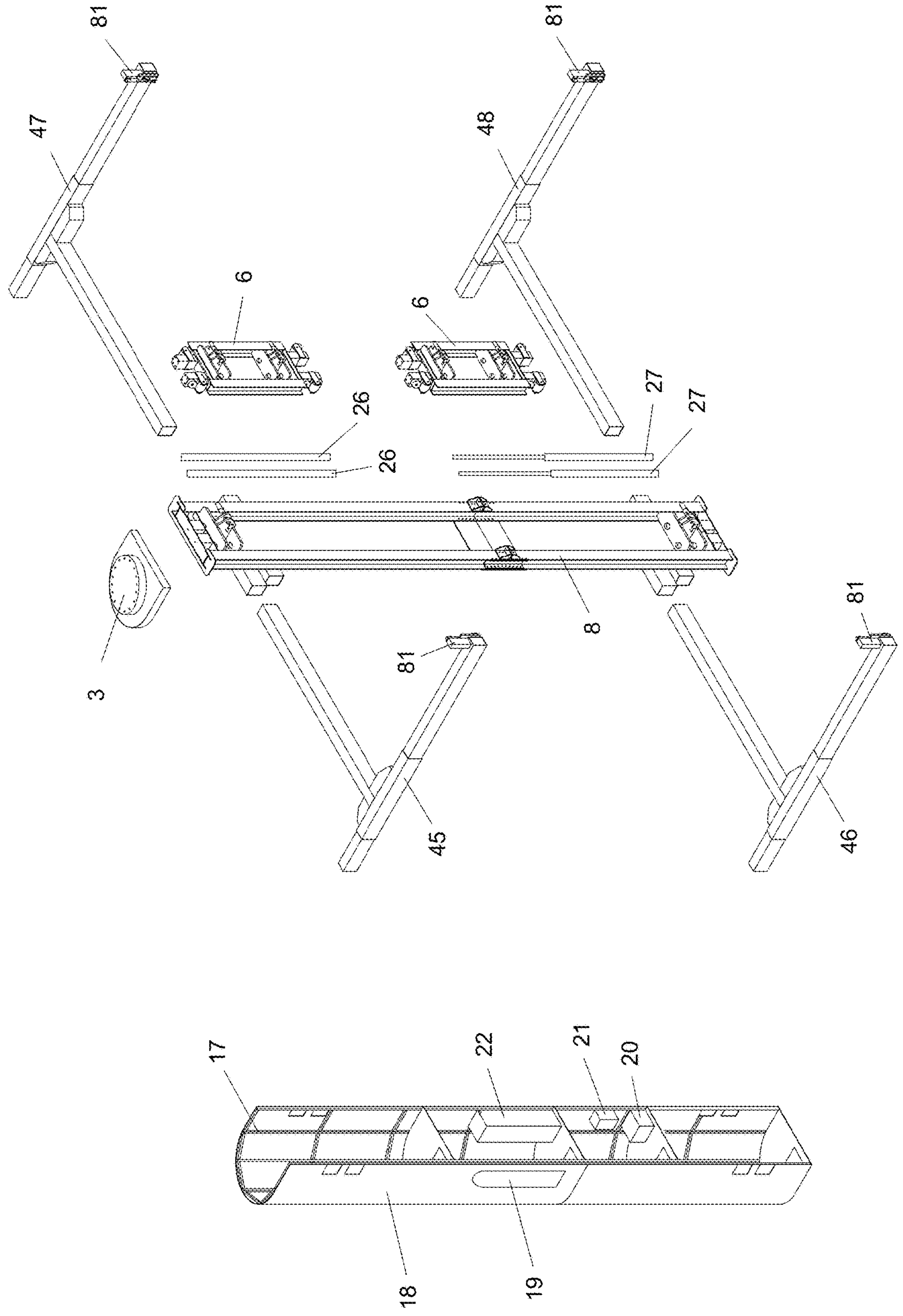

(003) FIG. 2 shows the general view of the climbing mechanism (1), and FIG. 3 shows the perspective views of its main components. The climbing mechanism (1) consists of the following main components.

Figure 4A:
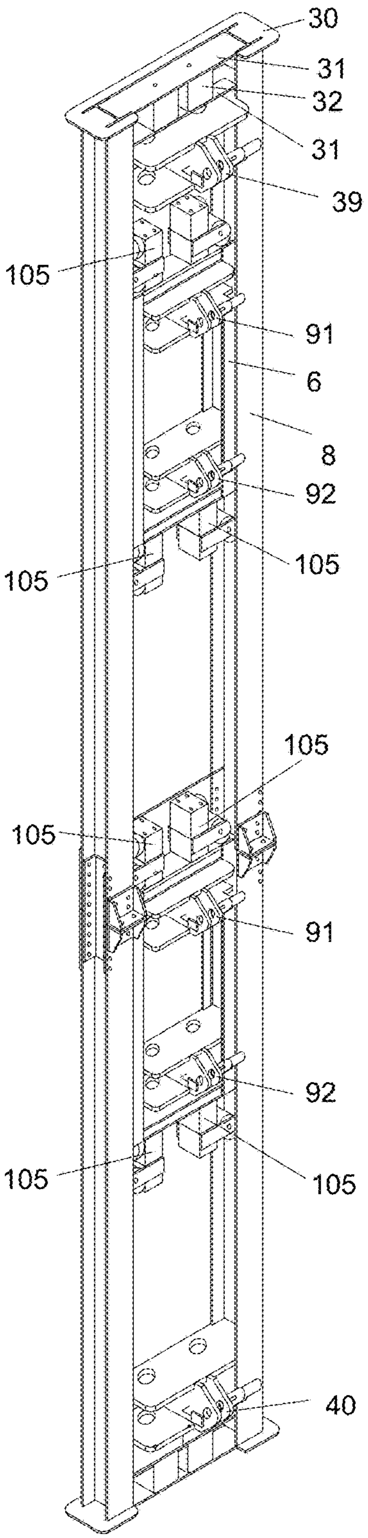
Figure 4B:
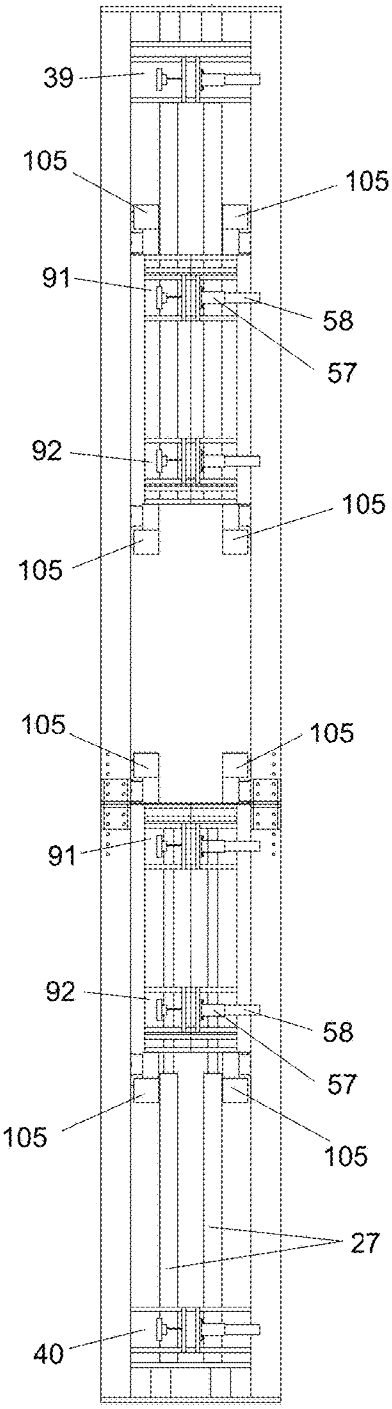

Elevator (9) with coincident x, y, z axes, containing outer skid (8) and two inner skids (6), guide bearings (29) mounted on outer skid (8); Right and left side arms moving in x,y,z axes (45,46,47,48), king pin U slots (90) on the side arms;

carrier chassis (17) and shell (18) mounted on the outer skid (8);

crane connection platform (3) mounted on the carrier chassis (17);

hydraulic tank (20) and hydraulic valve group (21) mounted inside the carrier frame (17) to operate the hydraulic cylinders and other hydraulic components in the climbing mechanism (1) and the crane (2);

electrical and electronic control panel (22) mounted inside the carrier cage system;

remote control room (5) located on the ground for remote control of the climbing mechanism (1) and the crane (2);

(004) FIG. 4B shows the perspective views of the outer skid (8), and FIG. 4A shows the main components of the outer skid (8). There are outer skid columns (42) on both sides of the outer skid (8), and reinforcement parts (30, 31 and 32) on its lower and upper edges. In addition, a durable structure is formed by strengthening it with reinforcement parts (30) in the direction of its height. The outer skid columns (42) can be made from standard NPI or NPU profiles. Or profiles with different cross-sections can be used. For ease of transportation, the outer skid (8) may be single or multi-piece. In FIG. 4A, the upper part of the two-piece outer skid (8) is shown as assembled and the lower part separated into its components.

Figure 5B:
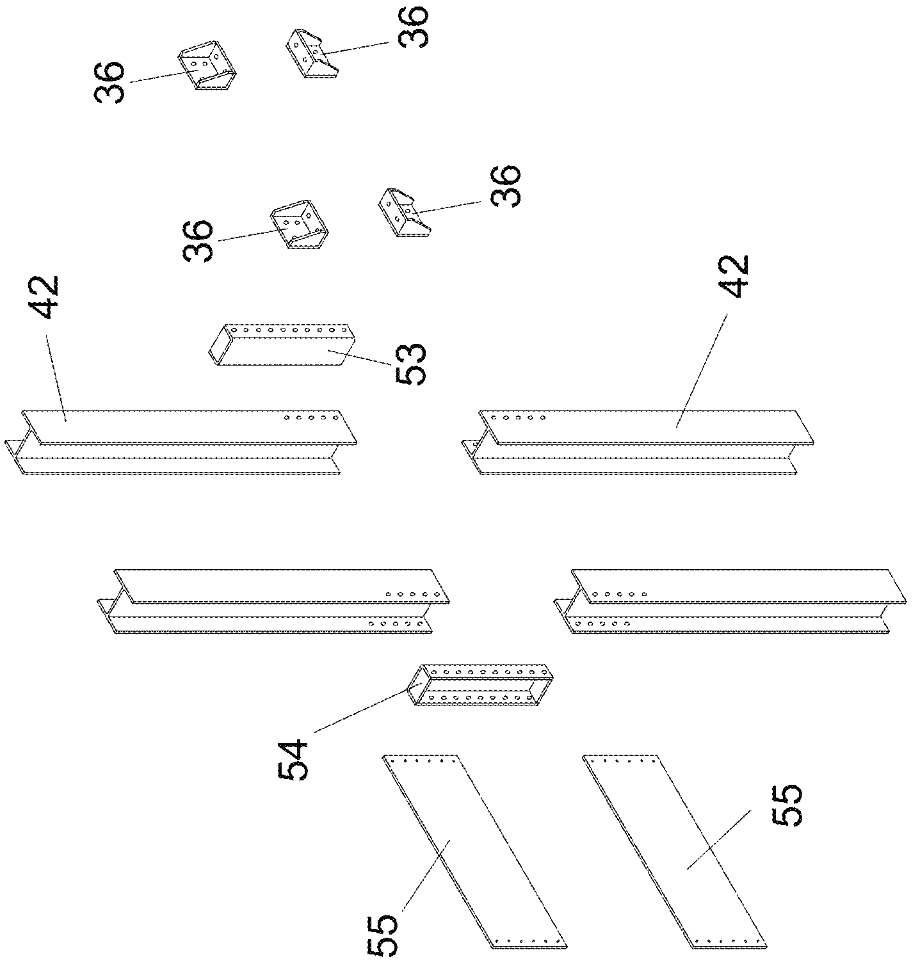
Figure 5A:
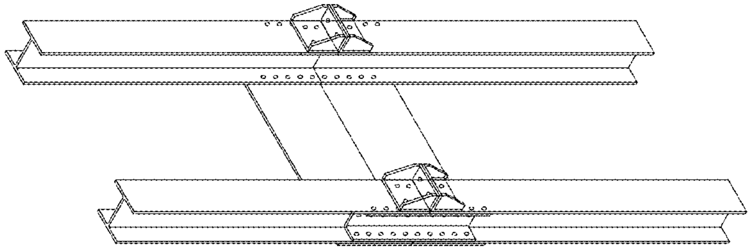
Figure 10:
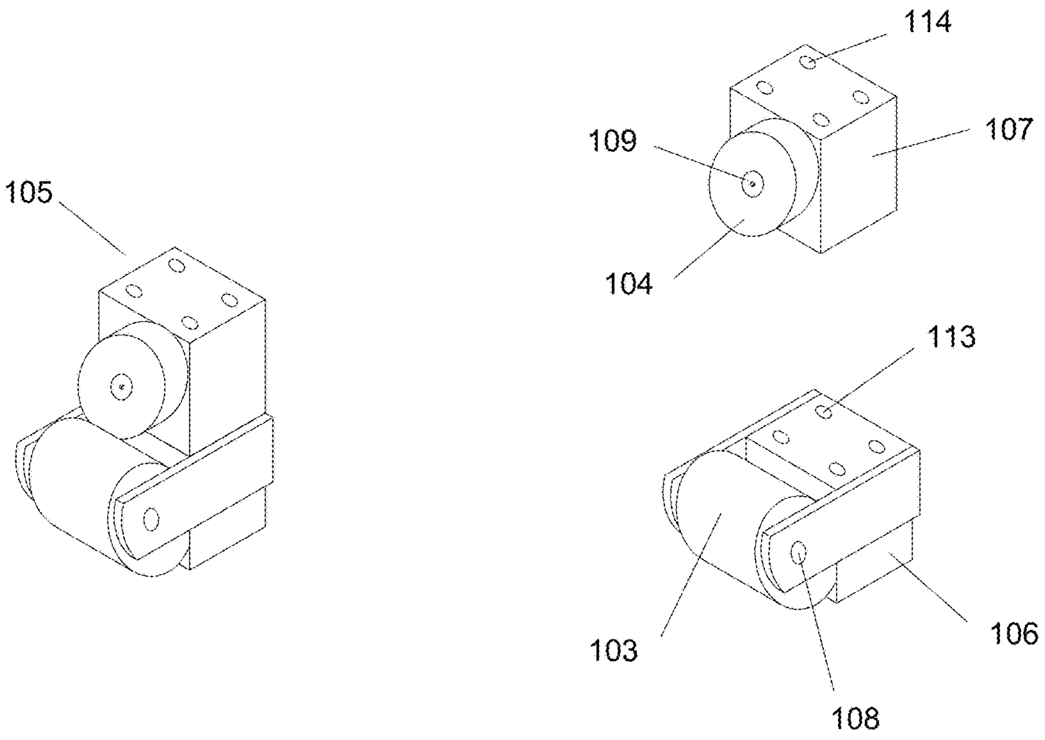

(005) In FIG. 5, the joint region in the skid columns (42) of the outer skid with two or more parts is shown enlarged. In the illustration, the outer skid columns 42 are shown in short length. FIG. 5B shows the assembly, FIG. 5A shows the views of the main components. The reinforcement parts (55) are fixed to the outer skid columns (42) by welding and bolts. Feders (36) and reinforcement parts (53 and 54) are welded and bolted to outer skid columns (42). The skid sections are attached or separated by bolts through the holes in the feders and reinforcement parts (36,53 and 54). All of the parts (36,53,54,55) used in the joint area are on the outer surfaces of the outer skid columns (42). Since the inner surfaces of the outer skid columns (42) are the surfaces on which the wheels (103 and 104) in the wheel group (105) operate, there are no additional parts (FIG. 10).

Figure 4C:
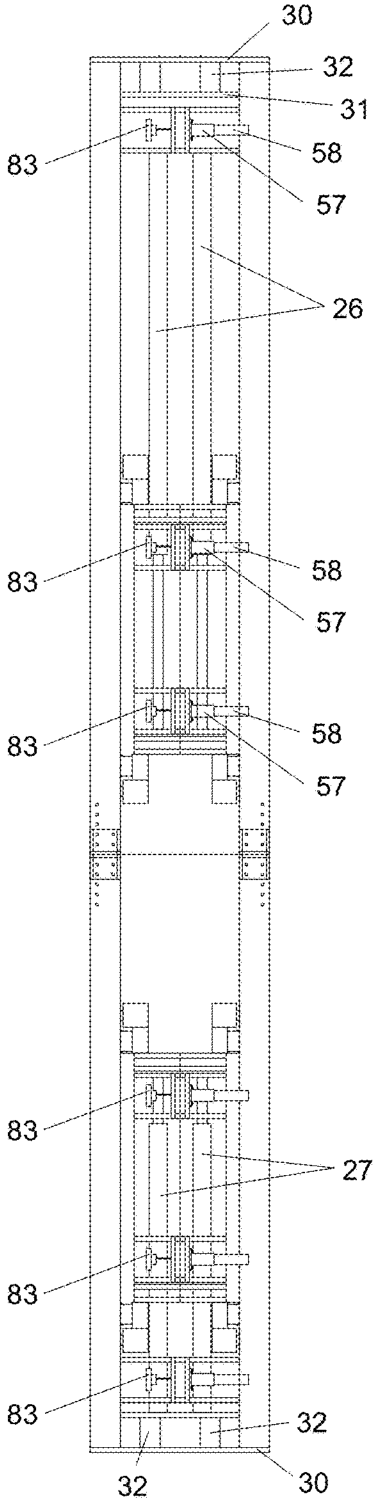
Figure 6A:
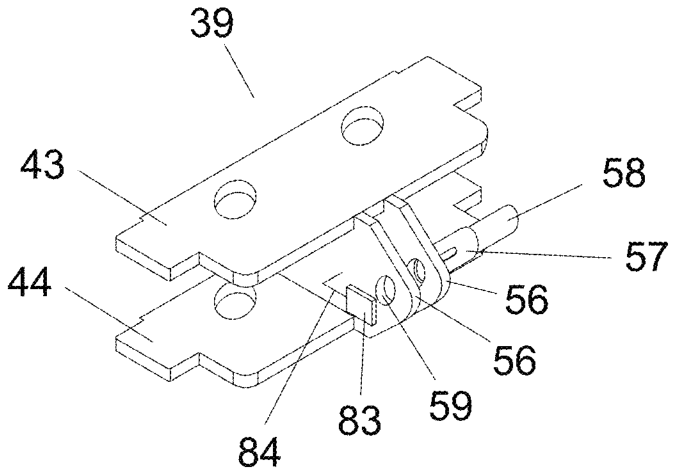
Figure 6B:
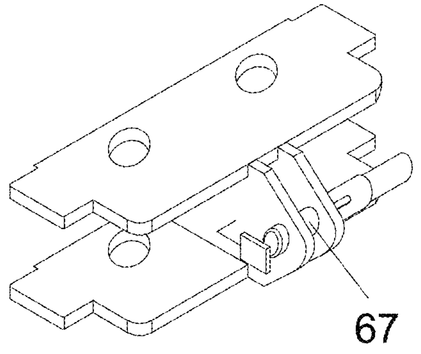
Figure 6C:
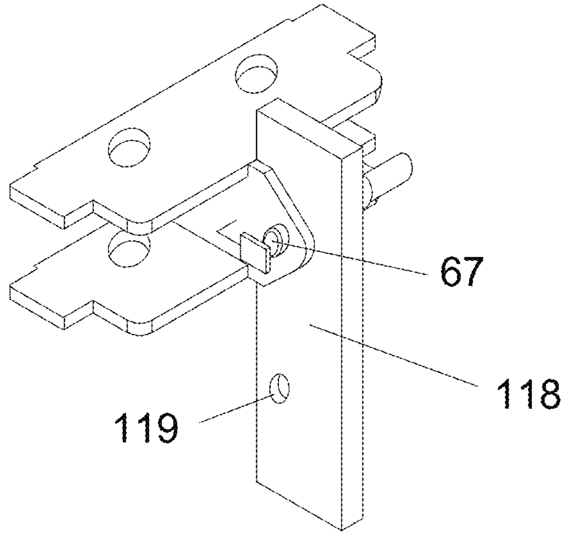

(006) There is one outer skid hanger parts (39 and 40) on the lower and upper parts of the outer skid (8) (FIG. 4). These hanger parts (39 and 40) are of the same construction. In FIG. 6, perspective views of the hanger part (39 and 40) are shown schematically. The outer skid (8) is fixed to the tower guide rail (118) by means of these hanger parts (39 and 40) (FIG. 6C). And at the same time, it transmits all the loads from the crane to the tower. The brackets (56) are welded to the reinforcement parts (43 and 44), the reinforcement parts (43 ve 44) are welded and bolted to the outer skid columns (42). The lock pin (67) moves in the guide tube (57) in the x-axis thanks to the hydraulic cylinder (58). The hydraulic cylinder (58) and guide tube (57) are fixed concentrically to the hole (59) in the bracket (56). When the outer skid (8) is moved up or down, the lock pin (67) is pulled into the guide tube 57 by the hydraulic cylinder 58 (FIG. 6A). When the upward or downward movement of the climbing mechanism (1) is completed, the lock pin (67) is driven into the hole (119) in the tower guide rail (118) by the hydraulic cylinder (58) (FIG. 6B). Thus, the outer skid (8) is fixed in its new position (FIG. 6C). The camera (83) used to monitor the position of the lock pin is fixed to the lock pin bracket (56) by the camera arm (84).

(007) There are four guide bearings 29 at the rear of the outer skid 8 (FIGS. 2A and 3A). Two of them are at the top and the other two are at the bottom. The side arms (45,46, 47,48) are moved in the guide bearings (29) in the X axis by means of hydraulic cylinders (41) (FIG. 2).

Figure 7B:
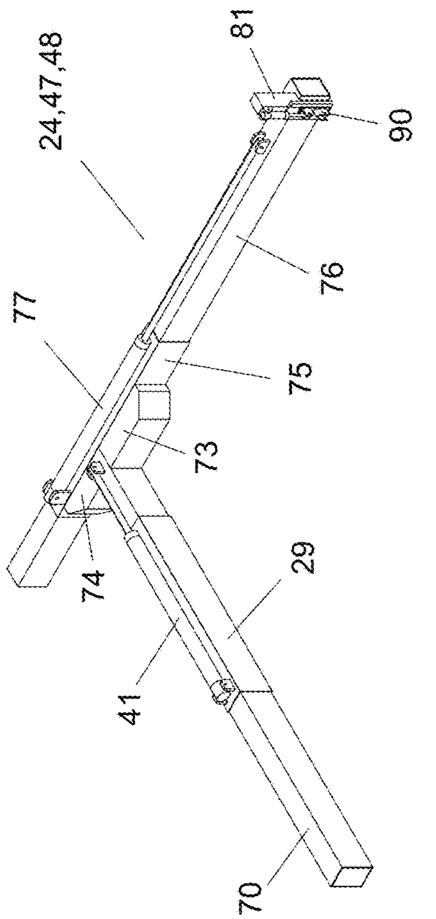
Figure 7A:
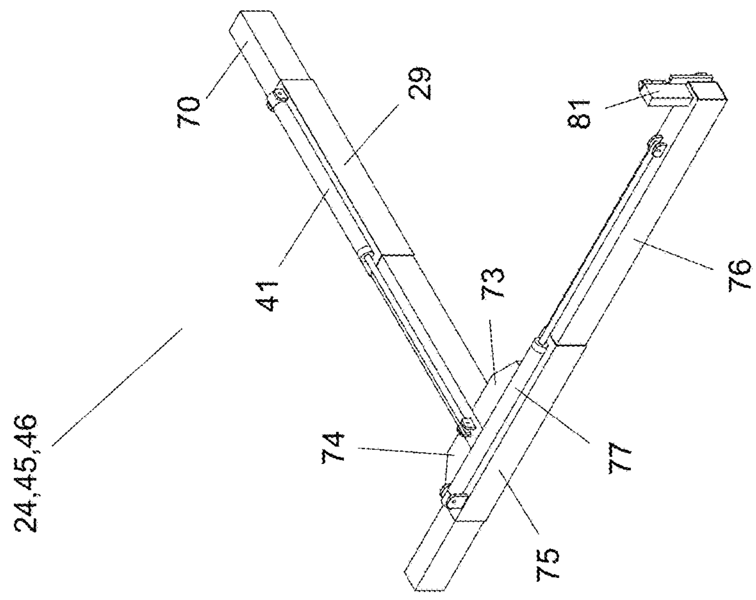

(008) In FIG. 7, there is a perspective view of the side arm assembly (24). There are four on the upper and lower parts of the climbing mechanism (1), on the right and left. The same side arm assembly (24) can be used as all four arms by changing the direction. The part numbers of the side arms are indicated as (45,46,47,48). In other words, the structure of all (45,46,47,48) is the same (FIG. 3). The side arm inner column (70) of the side arm is adjusted to the desired position by being moved in the X axis by means of the hydraulic cylinder (41) inside the guide bearing (29) mounted on the rear side of the outer skid (8). The other side arm guide bearing (75) is mounted on the end of the side arm inner column (70). There are corner reinforcement parts (73 and 74) to increase the rigidity of this joint. The side arm inner column (76) is adjusted to the desired position by moving it on the Z axis by means of the hydraulic cylinder (77) inside the side arm guide bearing (75). There is a U slot group (81) at the end of the side arm inner column (76). The U slot group (81) is fixed to the king pin (78) in the tower (FIG. 17), allowing the climbing mechanism (1) to be balanced on the tower (4). (Details will be described in the method of operation section (017) of the climbing mechanism below.)

Figure 8B:
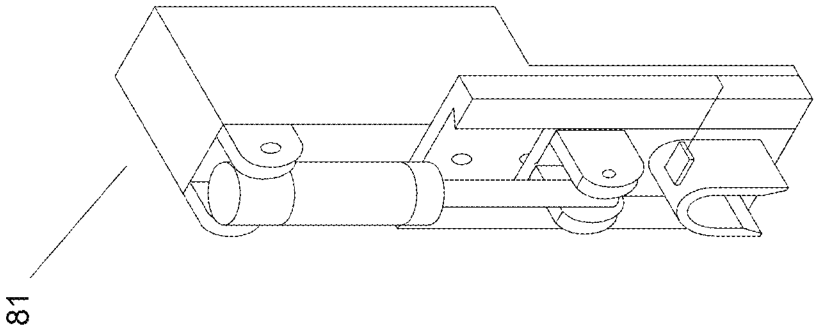
Figure 8A:
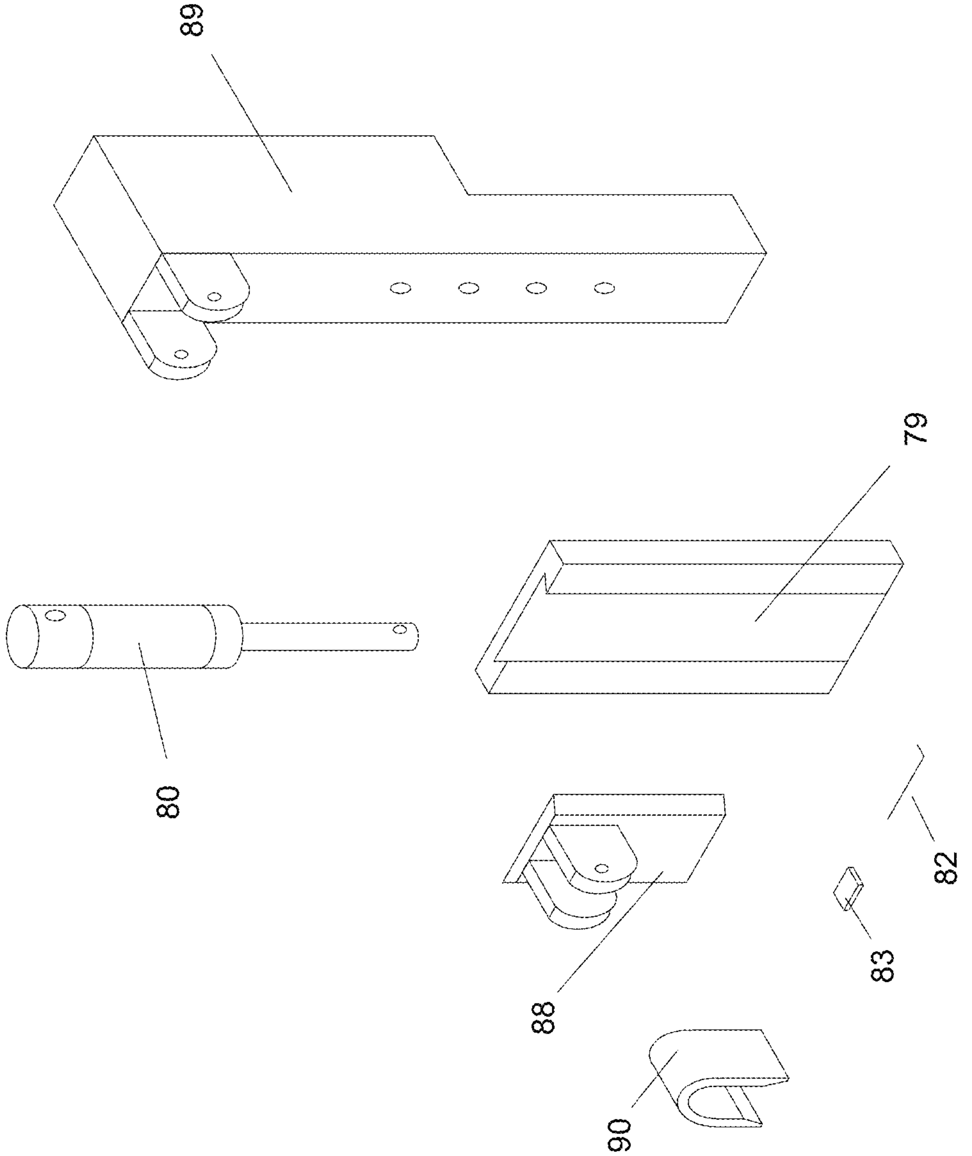

(009) Perspective views of the assembly and main components of the U slot group (81) are shown in FIG. 8. The side inner edges of the pool on the skid bearing (79) are in V form, and the slide skid part (88) with the same form on the sides works here. Brackets for hydraulic cylinder connection and U slot (90) are fixed on the skid skid part (88). The skid bearing 79 is fixed to the end portion of the side arm inner column 76 with reinforcement part (89) and ribs (FIG. 17), the skid bearing (79); the reinforcement part (89) and the feders are fixed to the end of the side arm inner column (76) (FIG. 17). The skid bearing (79) is fixed to the side arm inner column (76) by the reinforcement part (89) (FIG. 17). On the upper edge of the reinforcement part (89) there are brackets for the hydraulic cylinder connection. The camera (83) can be used to monitor the position of the U slot (90) and the king pin (78). The camera (83) can be attached to the reinforcement part (89) with the camera arm (82).

(010) When the climbing mechanism (1) is moved up or down to a new position, the axis of the U slot group (81) at the end of the side arm inner column (76) is moved along the X axis by hydraulic cylinders (41), the Z axis by hydraulic cylinders (77) to coincide with the axis of the king pin (78) on the tower (4). U It may be necessary to precisely adjust the position of the U slot group (81) on the Y axis. To achieve this, the king pin U slot group (81) U slot (90) can be moved in the Y axis with the help of the hydraulic cylinder (80) in the skid bearing (79) (FIGS. 8 and 17). The axis of the U slot (90) is adjusted to coincide with the axis of the king pin (78) on the tower in the Y axis, and the hydraulic cylinder (80) and the U slot (90) are mounted on the king pin. This is done separately for each of the four side arms (45,46,47 and 48). While doing this, the position of the U slot (90) and the king pin (78) can be followed from the camera (83).

Figure 9:
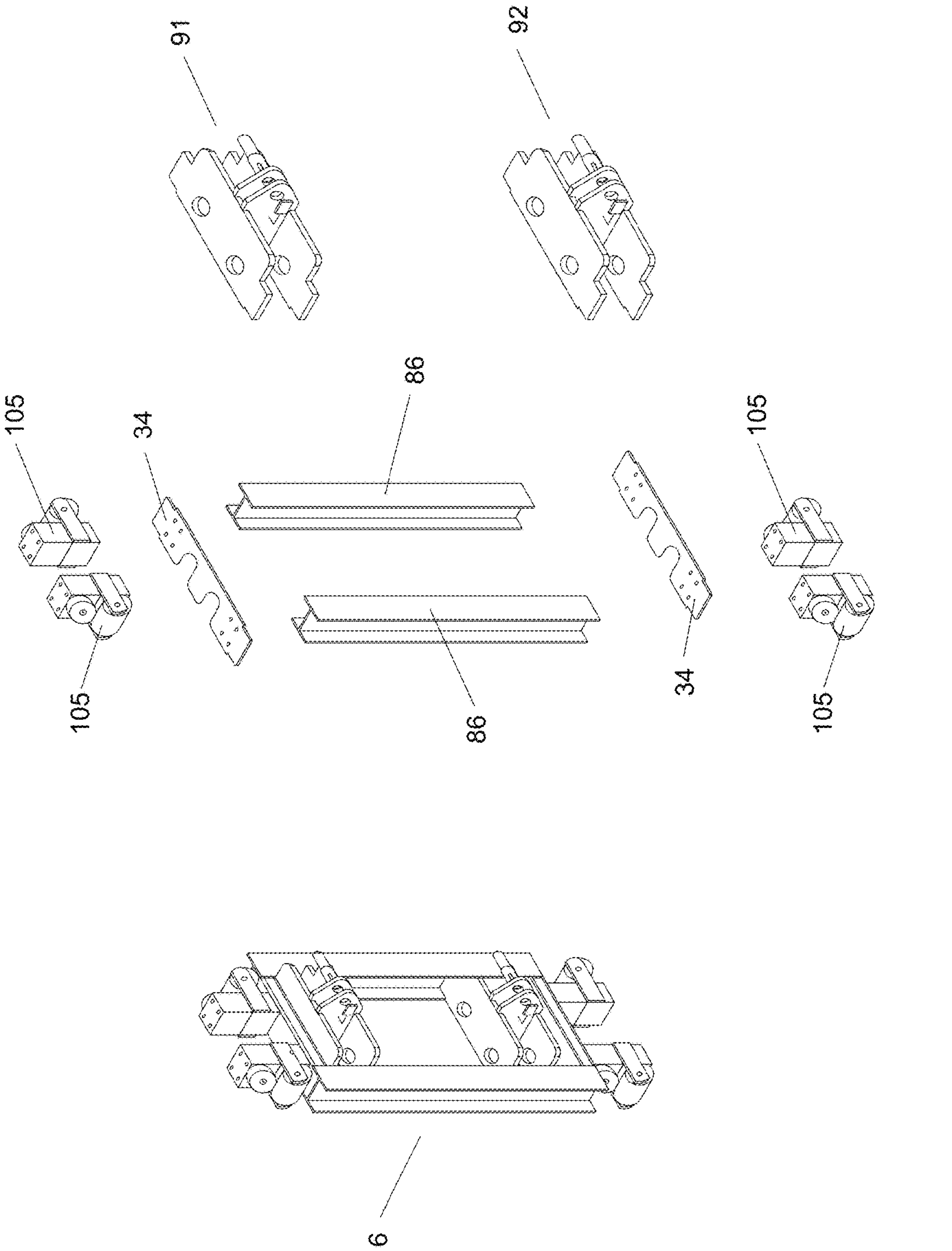

(011) FIG. 9 shows the perspective views of the inner skid (6) and its main components.

There are skid columns (86) on both sides of the inner skid (6) and reinforcement pieces (34) on its lower and upper edges FIG. 9). The skid columns (86) can be made from standard NPI or NPU profiles. Or profiles with different cross-sections can be used. There are inner skid hanger parts (91 and 92) on the upper and lower edges of the inner skid (6). The inner skid (6) is fixed to the tower guide rail (118) by means of these hanger parts (91 and 92) (FIG. 6C). And at the same time, it transmits all the loads from the crane to the tower. All parts are combined with bolts and welding connections to form a rigid and safe structure.

(012) The structure and mode of operation of the inner skid hanger parts (91 and 92) at the lower and upper edges of the inner skid (6) is the same as that of the outer skid hanger parts (39 and 40) described in section (006) above.

Figure 11:
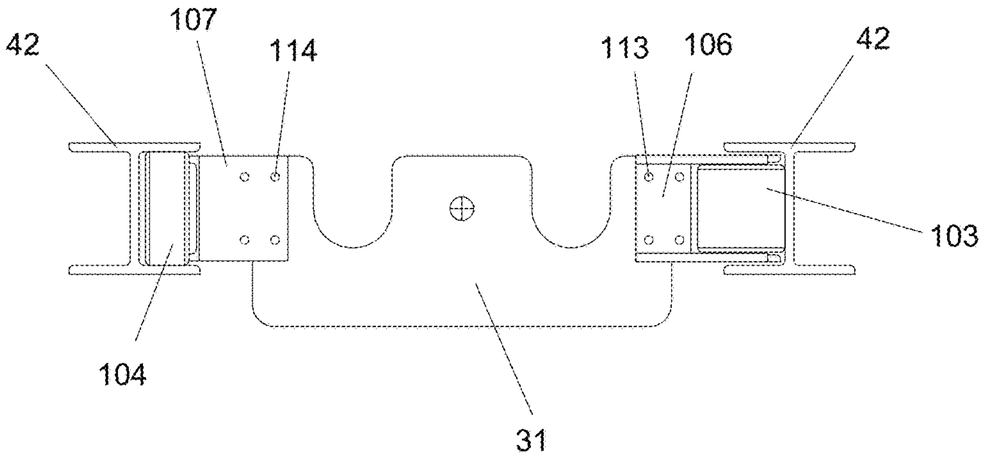

(013) According to the invention, there are wheel groups (105) on the right and left corners of the lower and upper edges of the inner skid (6) (FIGS. 9 and 10). In FIG. 10 there are perspective views of the wheel group (105) and its main components. The upper wheel (103) is mounted to the bushing body (106) with the shaft (108) and the pin (110). Its task is to ensure that the inner skid (6) moves up and down in the Y-axis direction by forming a spaceless and frictionless structure in the X-axis inside the outer skid columns (42) (FIG. 4). The lower wheel (104) is mounted to the bushing body (107) with the shaft (109). Its task is to enable the inner skid (6) to move up and down in the Y-axis direction by forming a spaceless and frictionless structure in the Z-axis inside the outer skid columns (42). The wheels groups (105) are mounted on the right and left corners of the lower and upper edges of the inner skid (6) with bolts through the bolt holes (113 and 114). The wheel groups (105) are symmetrical to each other with respect to the X and Y axes of the inner skid (6). The condition of the wheel groups (105) inside the outer skid columns (42) (FIG. 4) is shown in FIG. 11 as the top view of the outer skid chassis. Thanks to this design, a spaceless and frictionless structure is formed in the X and Z axes inside the inner skid (6), the outer skid columns (42) and it is provided to move up and down in the Y axis direction.

(014) After each tower module (116) mounted on the tower (4), the climbing mechanism (1) must be moved up by the module height (H). The module heights of modular towers are generally around H=12 meters. In order to move the elevator (9) up to a height of H, the length of the outer skid (8) must be at least twice the height of the tower module (H). This distance means the useful distance that the inner skids (6) can move on the inside of the outer skid (8). If an inner skid is used, the elevator (9) moves by H for each movement. In this case, the height of the inner skid (6) must be at least H. In the elevator (9), the movements of the inner and outer skids (6 and 8) are provided by hydraulic cylinders and two hydraulic cylinders are used for each inner skid (6). If an inner skid (6) is used, the stroke of the hydraulic cylinders should be as much as H, that is, H=12 meters. In practice, during the operation of hydraulic cylinders with such a long stroke (H=12 m), there is a risk of bending and twisting of their shafts. To avoid these problems, two or more inner skids (6) can be used. In this case, the stroke (H/number of skids) of the hydraulic cylinders that move the skids will be in meters. If H=12 m and the number of inner skids (6) is two, the stroke of the hydraulic cylinders is (12/2=6 m) and a total of four hydraulic cylinders are used. In order to move the climbing mechanism (1) up or down by H meters, the elevator (9) is used by making two consecutive cycles. If H=12 m and the number of inner skids (6) is three, the stroke of the hydraulic cylinders is (12/3=4 m) and six hydraulic cylinders are used. In order to move the climbing mechanism (1) up or down by H meters, the elevator (9) is used by making three consecutive cycles.

This document describes a climbing mechanism using two internal skids (6) and four hydraulic cylinders (26 and 27). This means that the elevator (9) moves as much as H/2 (m) in each movement of the skids (6 and 8) (ie, in each cycle). In order to move the climbing mechanism (1) up or down by H meters, the elevator (9) is used by making two consecutive cycles.

(015) According to the invention, the elevator (9) consists of two inner skids (6) moving in the Y axis inside the outer skid (8). The distance between the axes of the hole (59) in the hanger parts (91 and 92) of the inner skids (6) can be at most H/2 (meters) (FIG. 13). The distance between the axes of the hole (59) in the hanger parts (39 and 40) of the outer skid (8) must also be at least 2H (meters). The outer skid (8) is made in such a way that the useful distance that the inner skids (6) can move is at least 2H (m). That is, the total height of the outer skid (8) is more than 2H (meters).

Figure 13G:
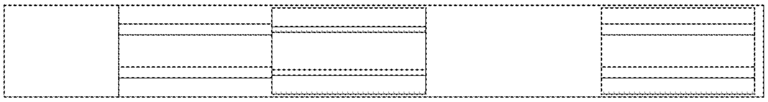
Figure 13F:
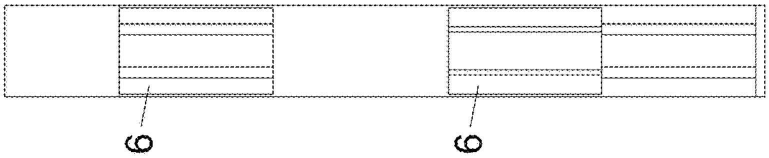
Figure 13E:
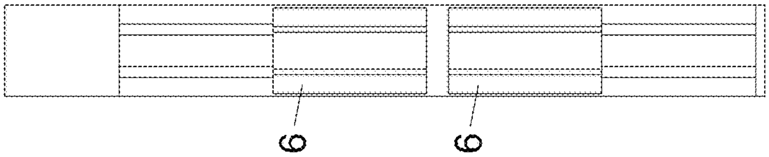
Figure 13D:
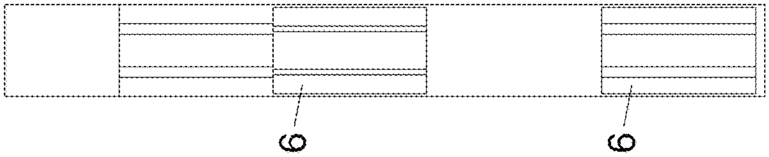
Figure 13C:
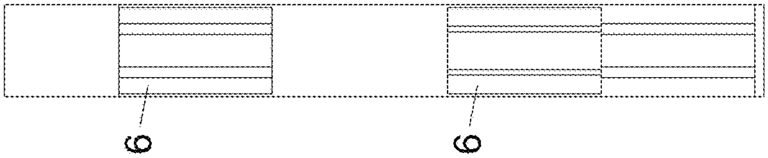
Figure 13B:
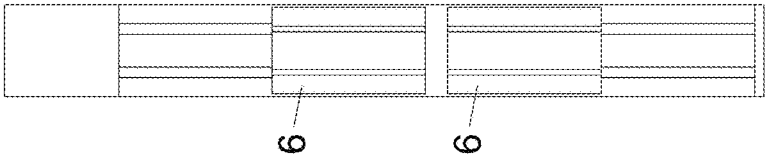
Figure 13A:
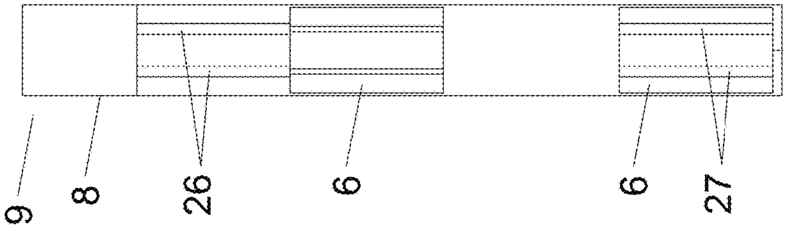

(016) There are two hydraulic cylinders (26) fixed to the upper part of the outer skid (8), and two hydraulic cylinders (27) fixed to the lower part (FIGS. 13A and C). The strokes of the hydraulic cylinders (26 and 27) are about H/2 meters and they move the inner skids (6) in the Y axis. One end of the hydraulic cylinders (26) in the upper part is connected to the outer skid (8) and the other end is connected to the inner skid (6) at the top. One end of the hydraulic cylinders (27) in the lower part is connected to the outer skid (8) and the other end is connected to the inner skid (6) at the bottom. The inner skids (6) move down and up thanks to hydraulic cylinders (26 and 27) inside the outer skid columns (42). This allows the climbing mechanism (1) to move up or down on the Y axis. The climbing mechanism (1) is fixed to the tower guide rail (118) thanks to the hanger parts (39 and 40) on the outer skid (8) and the hanger parts (91 and 92) on the inner skid (6) (FIG. 6C). Details about the hanger part were explained in the section (006) above. (See also FIG. 4). The steps of the working method of the elevator (9) will be explained in the section (017) below.

(017) When the climbing mechanism (1) is desired to be moved upwards, (FIG. 13)

170—) There should be absolutely no load on the crane.

171—) The lock pins (67) on the upper inner skid (6) hanger parts (91 and 92) are pulled back with the help of hydraulic cylinders (58) and removed from the holes (119) in the guide rail (118) (FIGS. 6 and 13A);

172—) The upper inner skid (6) is moved upwards with the help of hydraulic cylinders (26) (FIG. 13B);

173—) The lock pins (67) on the upper inner skid (6) hanger parts (91 and 92) are pushed forward with the help of hydraulic cylinders (58) and attached to the holes (119) on the guide rail (118) (FIGS. 6 and 13B);

174—) The lock pins (67) on the lower inner skid (6) hanger parts (91 and 92) are pulled back with the help of hydraulic cylinders (58) and removed from the holes (119) in the guide rail (118) (FIGS. 6 and 13B);

175—) The inner skid (6) at the bottom is moved upwards with the help of hydraulic cylinders (27) (FIG. 13C);

176—) The lock pins (67) on the lower inner skid (6) hanger parts (91 and 92) are pushed forward with the help of hydraulic cylinders (58) and attached to the holes (119) on the guide rail (118) (FIGS. 6 and 13C);

Note 1: While making transactions numbered (171-176); tower connection of the climbing mechanism (1) is provided by lock pins (67) on the outer skid (8) hanger parts (39 and 40);

177—) The U slots (90) on the side arms (45,46,47 and 48) are first moved upwards in the Y axis with the help of hydraulic cylinders (80) and then pulled outwards by moving them in the x axis with the help of hydraulic cylinders (41). (FIGS. 2 and 17);

178—) The lock pins (67) on the outer skid (8) hanger parts (39 and 40) are withdrawn with the help of hydraulic cylinders (58) and removed from the guide rail (FIGS. 6 and 13C);

179—) The outer skid (8) is moved upwards with the help of hydraulic cylinders (26 and 27) (FIG. 1). At this time, the climbing mechanism (1) is fixed to the tower (4) only with the lock pins (67) on the hanger parts (91 and 92) of the inner skids (6). (four in total);

180—) The lock pins on the outer skid (8) hanger parts (39 and 40) are pushed forward with the help of hydraulic cylinders (58) and inserted into the holes on the guide rail;

Note 2: While making transactions numbered (177-180); the connection of the climbing mechanism (1) with the tower (4) is provided by the lock pins (67) on the hanger parts (91 and 92) on the inner skids (6);

Note 3: Steps 171-172 . . . 179 and 180 are the first cycle of climbing. At the end of the first cycle, the climbing mechanism (1) has risen half the height of the tower module (116);

181—) The steps 171-172 . . . 180 above are repeated in the same order. (FIGS. 13E-F and G). This completes the second cycle of climbing. The climbing mechanism (1) is moved upwards by the height of the tower module (116);

182—) The position of the U slots (90) on the side arms (45,46,47,48) is monitored by cameras (83) and adjusted on the x, y, z axes with the help of hydraulic cylinders (41,77,80) and fixed on the king pins (78) on the tower (45) (FIG. 17). See also FIGS. 2, 8 and 17. In this case, the crane is ready for use;

Thus, the climbing mechanism (1) is moved in an upward direction up to twice the stroke of the hydraulic cylinders (26 and 27), that is, H (m). Here, the movement of the inner skids (6) can be done simultaneously or separately. When the climbing mechanism (1) is desired to be moved downwards, the same process is done from the end to the beginning.

Figure 14:
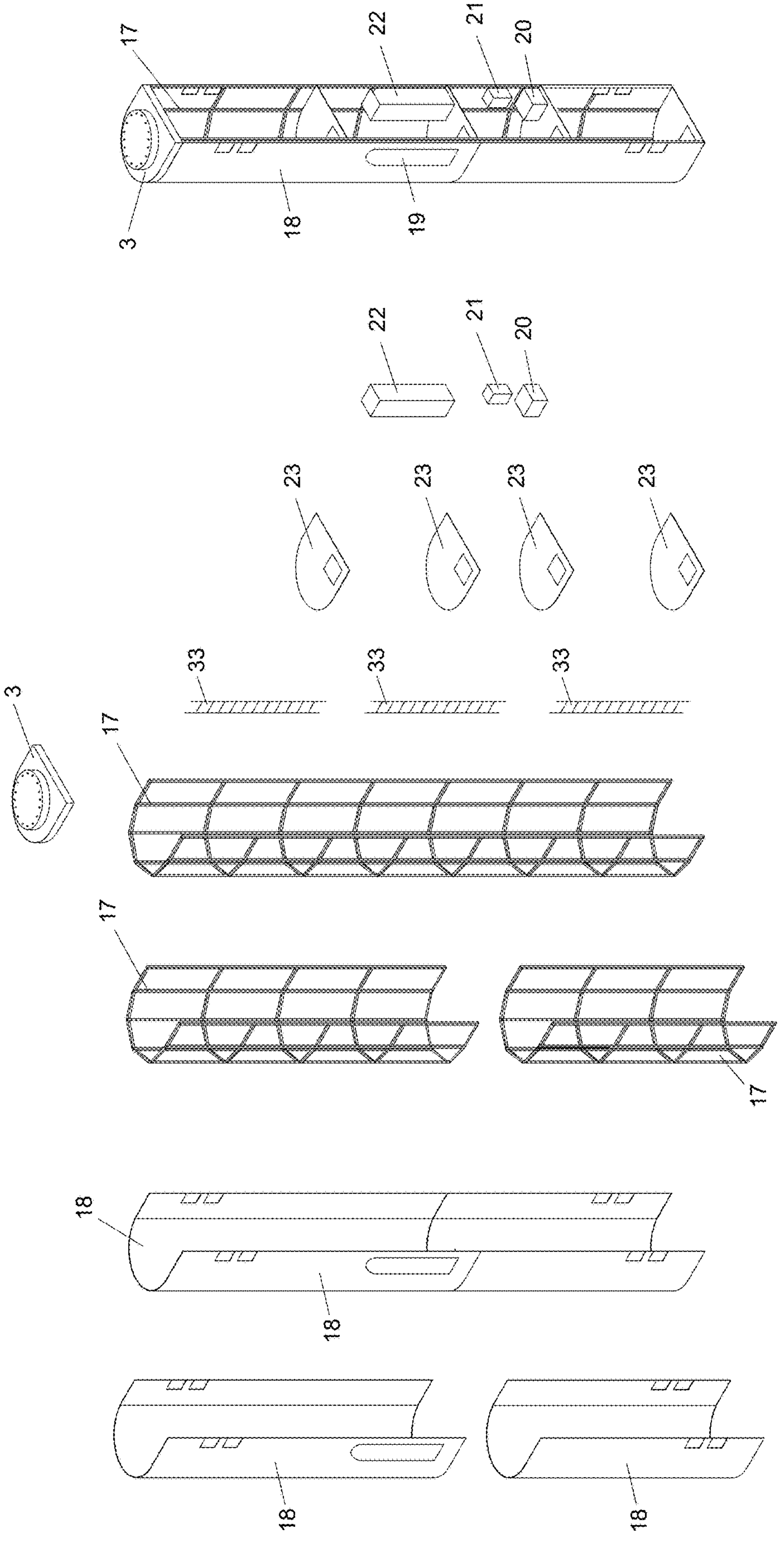

(018) In FIG. 14, there are perspective views of the carrier chassis (17) and the shell (18) as separate and assembled to each other. The carrier chassis (17) and the shell (18) can be produced in two or more modules for ease of transportation. The carrier chassis (17) is made of pipes and profiles and is fixed to the outer skid column (42) with bolts. There is a crane connection platform (3) on it. The loads coming from the crane (2) mounted on the connection platform (3) are transferred to the elevator (9) by means of the carrier chassis (17), and then to the tower (4) through the hanger parts (39,40,91,92) as a distributed load. There is a door (19) on the side of the carrier chassis (17). Inside, there are platforms (23) and stairs (33) (FIGS. 2 and 3). Hydraulic tank (20), hydraulic valve group (21), electrical and electronic control panel (22) are mounted on these platforms. Electricity is transmitted to the devices in the climbing mechanism thanks to the control panel. Electricity is transmitted to the devices in the climbing mechanism thanks to the electrical and electronic control panel (22).

(019) In order for the climbing mechanism (1) to be used in the assembly of the structure (for example, the wind turbine tower), there must be some special parts in the tower (4). These parts are planned in the design of the tower and produced together with the tower. These are elements such as guide rail (118), king pin slots (123), support rods (131).

(020) There is a guide rail (118) fixed to the tower element (117) so that the climbing mechanism (1) can hold onto the tower (4) and transmit the loads from the crane (2) to the base of the tower along with the tower elements (15 and 18). The guide rail (118) is fixed with bolts to the flanges (132) on the tower elements (117). The climbing mechanism (1) is fixed to the holes (119) on the guide rail (118) with the lock pins (67) in the hanger parts (39,40,91 and 92) located on the lower and upper edges of the outer and inner skids (6 and 8). The lock pins (67) are moved in the X axis by hydraulic cylinders (58) and inserted into the guide rail (118) holes (119) and removed. Details were explained in section (006) above.

(021) It was explained in the above sections (008 . . . 010) that there are side arms (45,46,47,48) that provide the balance of the climbing mechanism (1) while lifting the load with the crane (2). There are king pins (78) on which U slots (90) are attached, enabling the side arms (45,46,47,48) to be fixed to the tower. The king pin (78) is fixed to the king pin slot (123) with bolts (128). The king pin slot (123) is bolted to the tower element (117) (FIG. 17). The King pin slots (123) are mounted on two opposite tower elements (117) on each tower module (116) of the tower (4). The king pin bushing (124) is fixed to the metal plate (125) by welding. There are support plates (126) around it. A perspective view of the king pin slot (123) in FIG. 16B; its components are shown in FIG. 16A. The planes passing through the cylindrical surfaces of the King pin bushing (124) are not parallel to each other. Between them there is an angle (127), which is half the top angle of the tower. This feature, shown in FIG. 16C, ensures that the axes of the king pin (78) and the U slot (90) on the side arm coincide with each other. (See also FIGS. 15, 16 and 17).

Figure 18:
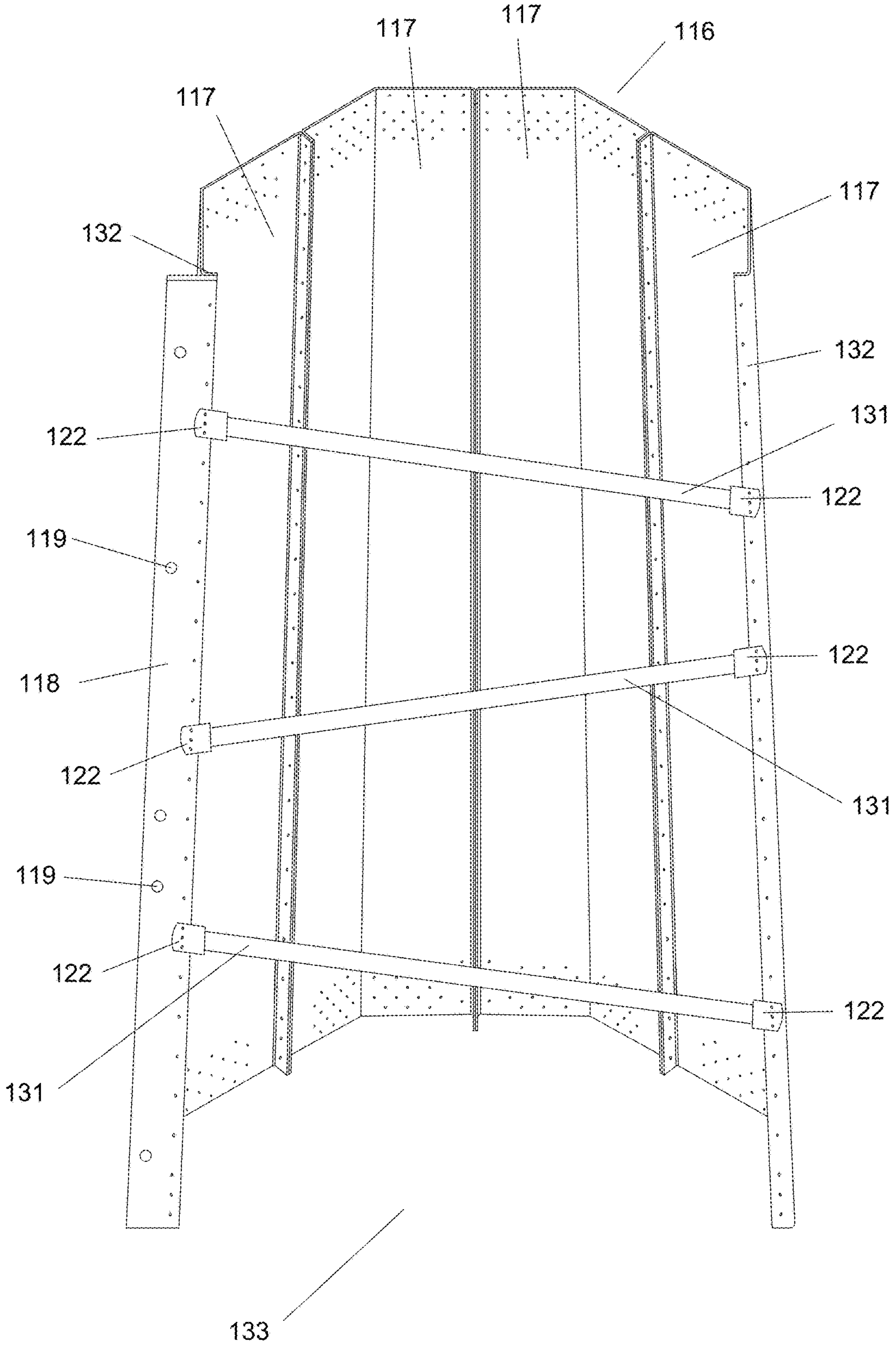

(022) The loads from the crane (2) are transmitted to the foundation via the guide rail (118) and tower elements (117). FIG. 18 shows the y-z cross-section (133) tower modules (116) according to the y-z plane. Support bars (131) can be used to balance the forces in the x, y and z axes on the guide rail (118) and to make it a distributed load. The support bars (131) are fixed to the flanges (132) on the tower member (117) with connecting parts (122) and bolts. The support bars (131) can be placed in line with the axes of polygonal or circular tower cross sections.

(023) There is a remote control room (5) on the floor to control the climbing mechanism (1). (FIG. 1). There is a remote control system in the remote control room (5). Hydraulic valves and crane (2) are operated by command from this remote control room (5). Communication between the remote control room (5) and the climbing mechanism is made by cables and signals from remote control devices. The climbing mechanism (1) is controlled by watching the images of the cameras (83) from this room.

(024) In FIG. 2, there is a perspective view of the climbing mechanism (1).

Figure 15E:
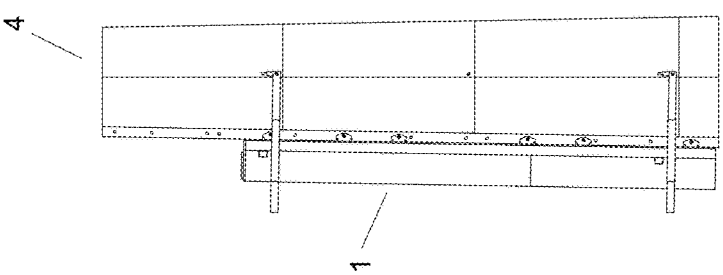
Figure 15D:
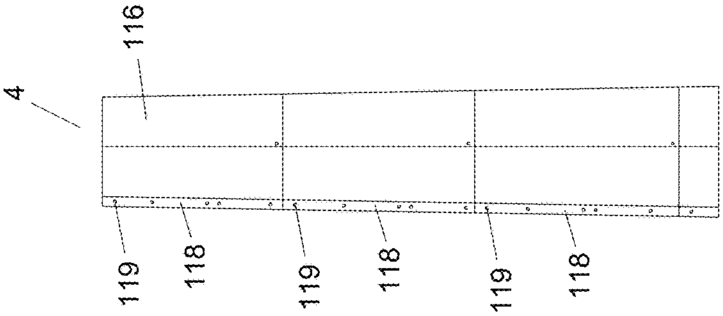
Figure 15C:
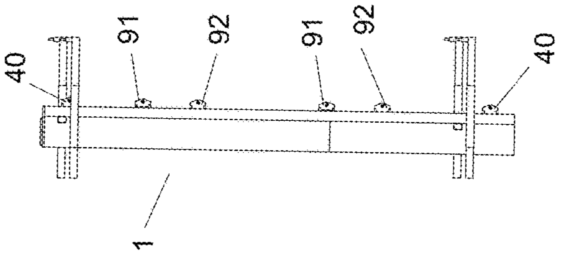
Figure 15B:
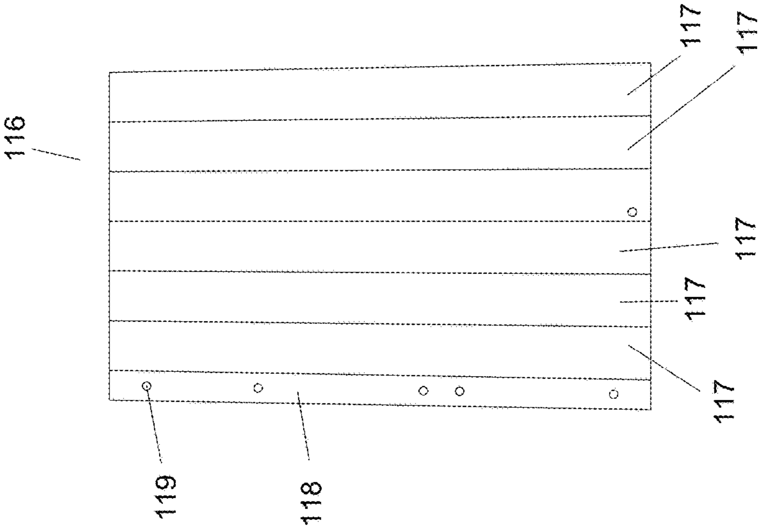
Figure 15A:
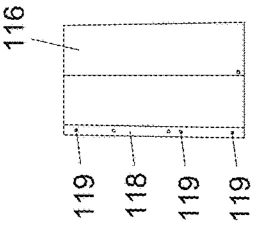
Figure 16A:
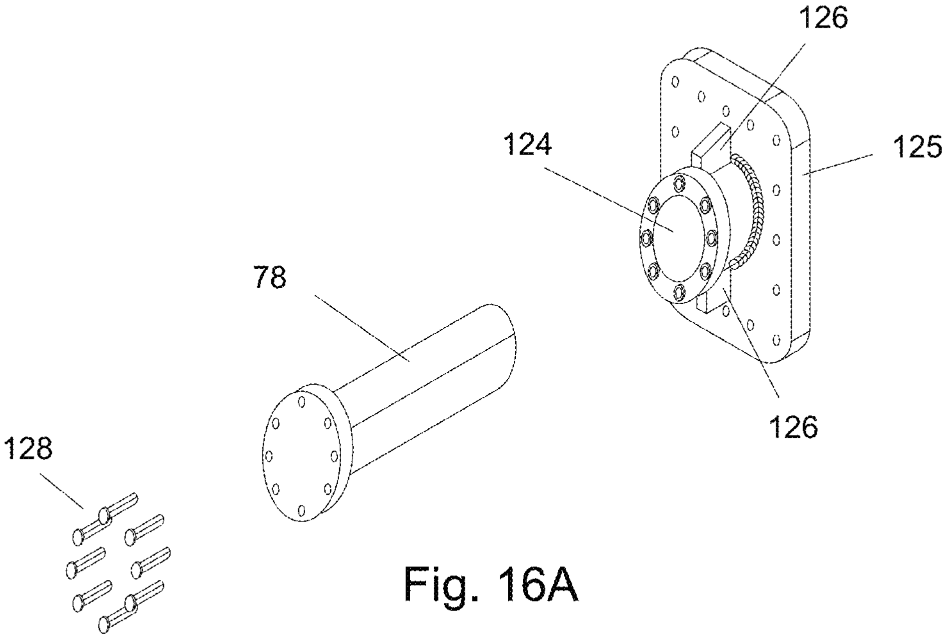
Figure 16B:
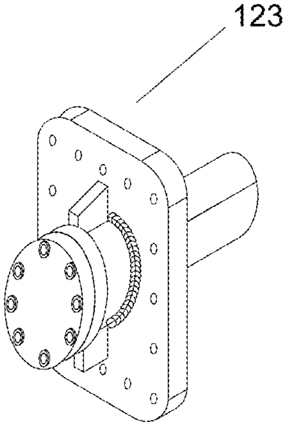
Figure 16C:
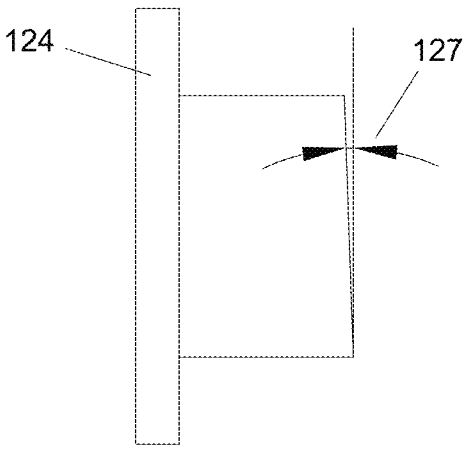

(025) FIG. 15E shows the first mounting condition of the climbing mechanism (1) on the tower (4). The crane (2) is mounted on the crane connection platform (3) and is made ready for use.

(026) The working method of the climbing mechanism is as follows.

Figure 21F:
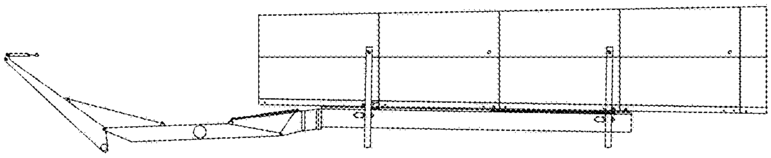
Figure 21E:
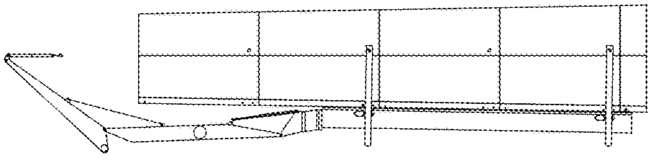
Figure 21D:
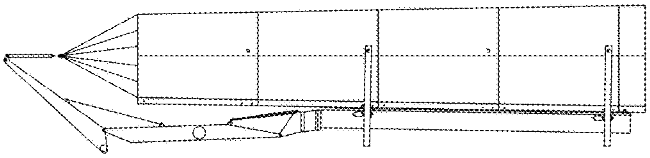
Figure 21C:
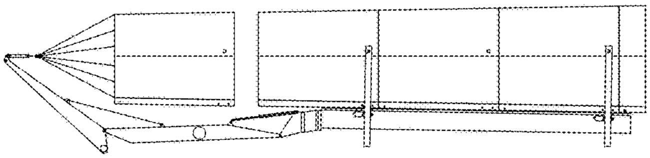
Figure 21B:
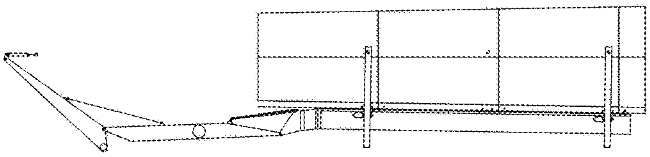
Figure 21A:
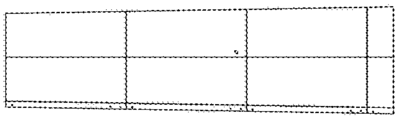

201—) The first three modules of the tower (4) are mounted with a smaller crane than the larger cranes (FIGS. 20 and 21A);

202—) Then the climbing mechanism (1) is mounted on the tower (4) (FIGS. 15E and 21B).

203—) The crane (2) is mounted on the crane connection platform (3) (FIGS. 1 and 21B);

204—) The cables that will transmit electricity to the climbing mechanism are connected;

205—) The electrical-electronic communication system of the remote control room (5) and the climbing mechanism (1) is operated (FIG. 1);

206—) The position of the U slots (90) on the side arms (45,46,47,48) is monitored by cameras (83) and adjusted on the x, y, z axes with the help of hydraulic cylinders (41,77,80) and fixed on the king pins (78) on the tower (45) (FIG. 17). See also FIGS. 8 and 17. In this case, the crane is ready for use;

207—) The fourth module of the tower (4) is lifted by the crane (2) (FIG. 21C) and mounted on the third module (FIGS. 21D and 21E);

208—) The climbing mechanism (1) is moved upwards by applying the method described in the section (017) above. (FIG. 21F);

209—) Procedures numbered (207 and 208) are applied for each of the next modules and the tower (4) assembly is completed;

210—) Later, other elements of the wind turbine such as the nacelle, rotor and blades are lifted by crane and mounted in their places.

211—) Finally, the climbing mechanism (1) is lowered to the ground and removed from the tower;

THE WAY THE INVENTION IS APPLIED TO INDUSTRY

The invention can be used for the assembly of wind turbines and similar structures by purchasing and installing a purpose-built crane after it has been manufactured at the factory.

The invention claimed is:

1. A climbing mechanism (1) arranged for upward or downward movement on an outer surface of a tower (4), wherein said climbing mechanism (1) comprises:

an elevator (9) comprising two inner skids (6) adapted to move along a Y axis within an outer skid (8), said elevator (9) being adapted to move along the Y axis on a guide rail (118) mounted on the tower (4);

a plurality of side arms (45,46,47,48) acting on an X-axis in a guide bearing (29) of each arm of the plurality of side arms mounted on the outer skid (8) of the elevator (9) and configured to fix the climbing mechanism (1) to the tower (4), a side arm inner column (76) of each arm of the plurality of side arms moving on a Z axis in a guide bearing (75) of each arm of the plurality of side arms for fixing the climbing mechanism (1) to the tower (4);

a U slot group (81) located at an end of the side arm inner column (76) of each arm of the plurality of side arms, movable along the Y axis and configured to fix the climbing mechanism (1) to a king pin (78) on the tower (4);

wherein said side arms (45,46,47,48) are configured to be fixed to the king pin (78) of the tower (4) to ensure stability of the climbing mechanism (1) on the X axis;

a carrier chassis (17) configured to transmit loads from the outer skid (8) chassis to the guide rail (118) and the tower (4), a shell (18) that provides protection of the carrier chassis (17) from external influences;

a crane connection platform (3) mounted on the carrier chassis (17) and configured to receive a crane (2); and a hydraulic tank (20), a hydraulic valve group (21) and an electrical and electronic control panel (22) mounted inside the carrier chassis (17), for operating the climbing mechanism (1).

2. The climbing mechanism (1) according to claim 1, wherein the elevator (9) further comprises hydraulic cylinders (26, 27) arranged to move the inner skids (6) along the Y axis within the outer skid (8).

3. The climbing mechanism (1) according to claim 2, wherein the outer skid (8) comprises hanger parts (39, 40) adapted to fix the outer skid (8) of the elevator (9) to the guide rail (118), and skid columns (42) defining an interior space for receiving the inner skids (6).

4. The climbing mechanism (1) according to claim 3, wherein each inner skid (6) comprises hanger parts (91, 92) adapted to fix the inner skid (6) of the elevator (9) to the guide rail (118).

5. The climbing mechanism (1) according to claim 4, wherein the inner skid (6) comprises a plurality of wheel groups (105) adapted to move the inner skid (6) within skid columns (42) of the outer skid (8), wherein each wheel group (105) comprises:

an upper wheel (103) arranged to operate the inner skid (6) inside the skid columns (42) of outer skid (8) with minimal clearance and friction along the X axis when the inner skid (6) is moving along the Y axis; and a lower wheel (104) arranged to operate the inner skid (6) inside the skid columns (42) of outer skid (8) with minimal clearance and friction along the Z axis when the inner skid (6) is moving along the Y axis;

a plurality of bushing bodies (106, 107) for mounting the wheels (103 and 104), each bushing body having bolt holes (113, 114) for fixing the wheel group (105) to the inner skid (6).

6. The climbing mechanism (1) according to claim 4, wherein each hanger part (39, 40, 91, 92) comprises:

brackets (56) fixed to the reinforcement parts (43 and 44) by welding;

a lock pin (67) configured to engage a hole (119) in the guide rail (118)

a guide tube (57) and a hydraulic cylinder (58), mounted concentrically to a hole (59) in the bracket (56), that enable the lock pin (67) to move along the X-axis; and a camera (83) positioned to monitor the engagement of the lock pin (67) with the hole (119) in the guide rail (118).

7. The climbing mechanism (1) according to claim 1, wherein each side arm (45,46,47,48) comprises:

a first side arm inner column (70) movable along the X axis within a side arm guide bearing (29), actuated by a first hydraulic cylinder (41);

a second side arm inner column (76) movable along the Z axis within a side arm guide bearing (75) fixed to an end of the first side arm inner column (70), actuated by a second hydraulic cylinder (77);

reinforcement parts (73, 74) at a joint region of the side arm guide bearing (75) and the second side arm inner column (76).

8. The climbing mechanism (1) according to claim 7, wherein the U slot group (81) comprises:

a U slot (90) arranged for engaging the king pins (78) of the tower (4);

a skid bearing (79), a skid part (88) and a third hydraulic cylinder (80) arranged to move the U slot (90) along the Y axis;

a further reinforcement part (89) for fixing the skid bearing (79) to the second side arm inner column (76);

a camera (83) positioned to monitor the engagement of the U slot (90) to the king pins (78).

9. The climbing mechanism (1) according to claim 1, wherein the carrier chassis (17) comprises:

a multi-part structure of pipes and profiles for transmitting loads from the crane (2) to the elevator (9);

a plurality of platforms (23), stairs (33) and a door (19) for access.

10. The climbing mechanism (1) according to claim 1, wherein the shell (18)

has a cross-section corresponding to an outer surface of the carrier chassis (17), and is comprised of modules arranged to be divided into two or more parts, for ease of transportation and installation;

is made of steel or composite material; and has a door (19) for providing access to the inside of the carrier chassis (17).

11. A system for assembling a tower, the system comprising:

the climbing mechanism (1) according to claim 1; and a tower (4) comprising a guide rail (118) for guiding the movement of the climbing mechanism (1); and at least one king pin (78) mounted in a king pin bushing (124), wherein the king pin bushing (124) is oriented at an angle (127) relative to a vertical plane, the angle (127) being equal to half of a taper angle of a top portion of the tower, so as to compensate for a taper of the tower, and thereby ensure coaxial alignment between the king pin (78) and a U-slot (90) of the climbing mechanism (1).

12. A method of assembling a tower (4) using the climbing mechanism (1) of claim 1, the method comprising the steps of:

a) mounting a base portion of the tower (4) comprising one or more modules;

b) mounting the climbing mechanism (1) on the guide rail (118) of the base portion of the tower (4);

c) mounting the crane (2) onto the crane connection platform (3) of the climbing mechanism (1);

d) operating the elevator (9) to move the climbing mechanism (1) upwards along the guide rail (118) to a new position;

e) after moving to the new position, securing the climbing mechanism (1) to the tower (4) by engaging a U-slot (90) of the U-slot group (81) with the king pin (78) on the tower, wherein said engagement involves moving the U-slot (90) vertically to align with and receive the king pin (78);

f) using the crane (2) to lift a subsequent tower module and mounting said subsequent tower module on top of a previously assembled portion of the tower (4);

g) repeating the steps (d), (e) and (f) of to assemble the tower (4) to a full height of the tower.

13. The method according to claim 12, wherein the step (a) of mounting the base portion of the tower is performed using an external ground-based crane.

14. The method according to claim 13, further comprising the steps of: after assembling the tower (4), using the crane (2) to lift and mount wind turbine components, and subsequently, lowering the climbing mechanism (1) to ground level and removing the climbing mechanism from the tower (4).

15. The method according to claim 12, wherein the step (d) of operating the elevator (9) to move the climbing mechanism (1) upwards comprises the following cycle of steps:

i. disengaging first hanger parts (91, 92) of both inner skids (6) from the guide rail, while the outer skid (8) remains fixed to the guide rail (118) by second hanger parts (39, 40);

ii. moving both inner skids (6) upwards using hydraulic cylinders (26, 27) and engaging the first hanger parts (91, 92) with the guide rail (118) at new, higher positions;

iii. with the inner skids (6) now fixed at new positions of the inner skids, disengaging the second hanger parts (39, 40) of the outer skid (8) from the guide rail (118);

iv. moving the outer skid (8) upwards relative to the inner skids (6) to align with the inner skids, and reengaging the second hanger parts (39, 40) with the guide rail (118).

* * * * *